US009860213B2

(12) United States Patent
Branca

(10) Patent No.: US 9,860,213 B2
(45) Date of Patent: *Jan. 2, 2018

(54) METHOD AND SYSTEM FOR SECURING AND PROTECTING SMART DEVICES WITHIN THE INTERNET OF THINGS ECOSYSTEM

(71) Applicant: IOMAXIS, LLC, Springfield, VA (US)

(72) Inventor: David L. Branca, Springfield, VA (US)

(73) Assignee: IOMAXIS, LLC, Springfield, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/983,800

(22) Filed: Dec. 30, 2015

(65) Prior Publication Data

US 2016/0112374 A1 Apr. 21, 2016

(51) Int. Cl.
H04L 29/06 (2006.01)

(52) U.S. Cl.
CPC ........ *H04L 63/0263* (2013.01); *H04L 63/102* (2013.01); *H04L 63/20* (2013.01)

(58) Field of Classification Search
CPC ... H04L 63/0263; H04L 63/20; H04L 63/102; H04L 63/0281; H04L 63/0227; H04L 12/66; H04L 12/2803; H04L 12/2807; H04L 12/2816; H04L 12/2823; H04L 12/2827
See application file for complete search history.

(56) References Cited

U.S. PATENT DOCUMENTS

2011/0277001 A1* 11/2011 Kaluskar ............. H04L 12/2818
725/80
2014/0068030 A1* 3/2014 Chambers ........... H04L 41/0809
709/220

OTHER PUBLICATIONS

Office Action for U.S. Appl. No. 15/340,609 dated Feb. 28, 2017.
Final Office Action issued in U.S. Appl. No. 15/340,609, dated Jun. 9, 2017, 28 pages.

* cited by examiner

*Primary Examiner* — Noura Zoubair
(74) *Attorney, Agent, or Firm* — RatnerPrestia

(57) ABSTRACT

A gateway device including a network interface having wired and/or wireless connections to smart devices and a network access point. The gateway device also includes a processor and a memory device having a local database. The processor is configured to execute a network controller for connecting and communicating with the smart devices and the network access point, a firewall engine for enforcing firewall rules stored in the local database for filtering communication between the smart devices and the network access point, and a management interface. The management interface generates internal firewall rules based on device profile information received from a remote database.

14 Claims, 9 Drawing Sheets

FIG. 7B

Available For Association — 700B

| Select | Type | Description | Location | MAC Address | Make | Model |
|---|---|---|---|---|---|---|
| X | Light | Cabinet light | Kitchen | XX:XX:XX:XX:XX:X X | NAME | MODEL # |
| ☐ | Sensor | Motion sensor | Basement | XX:XX:XX:XX:XX:X X | NAME | MODEL # |
| ☐ | Camera | Door camera1 | Front Door | XX:XX:XX:XX:XX:X X | NAME | MODEL # |

[Confirm Selection]

724, 722, 726

METHOD AND SYSTEM FOR SECURING AND PROTECTING SMART DEVICES WITHIN THE INTERNET OF THINGS ECOSYSTEM

FIELD OF THE INVENTION

The present invention relates to securing and protecting smart devices and network enabled intelligent electronic devices within the Internet of things (IoT) ecosystem. Specifically, this invention relates to device access and data security of industrial and consumer level smart devices, such as sensors and appliances, from local and remote network access vectors through application of graphically configurable, user defined, network communication filtering policies.

BACKGROUND OF THE INVENTION

The expansion and evolution of networked devices is rapidly changing the functionality, application and utility of technology in industrial and consumer markets. The Internet of Things (IoT), a term coined by Kevin Ashton in 1999, describes physical objects that are connected through a network to other devices or networks. Devices that communicate across networks using one or a variety of protocols are called smart devices. Devices that natively do not have network connectivity but can process data are called intelligent electronic devices. When networking is applied to an intelligent electronic device, the device can then be categorized as a smart device. Since the introduction and widespread adoption of smart phones (e.g. Apple iPhone—a network enabled intelligent electronic device), the types and variety of smart devices being connected with local networks and across the Internet has grown exponentially through new products and the retrofitting of legacy intelligent electronic devices.

Modern day smart devices and systems are designed, engineered and manufactured with native network communication capabilities and data processing power. Product concepts and designs already account for Internet connectivity and device interoperability in the product development phase—improving product functionality and flexibility. The interconnectivity of smart devices also enables the smart devices to communicate and affect the functions of other smart devices. For example, a building's security system's motion sensors can be configured to communicate with the lighting system. If when the security system is active and a motion sensor detects motion, the security system can instruct the light system to turn on all the interior lights. As illustrated, the capabilities of smart devices provide many benefits.

The rapid, wide-scale adoption of smart device technologies has resulted in fierce competition between manufactures. To maintain competitiveness and profitability, device manufacturers are utilizing condensed and shortened product development lifecycles for delivering new capabilities. The tradeoff of truncated product development lifecycles for fast release of new capabilities is security. The security measures and associated subsystems of new and retrofitted smart devices are poorly accounted for, if at all, by manufacturers. This shortsightedness can result in design flaws or incompatibility issues between smart devices and systems. Due to the truncated product development lifecycles, design flaws or incompatibility issues can be overlooked or unaddressed, weakening the security posture of the smart device and system, threatening privacy and safety. This highlights the need for additional protection.

To incorporate a legacy intelligent electronic device into the IoT ecosystem, the device can be replaced with an actual smart device or it can be retrofitted to become a smart device. If no current smart device fits the needs of the legacy intelligent electronic device, or if the upgrade of the legacy device to a new smart device is too cost prohibitive, the legacy device can be retrofitted with network capabilities through additional hardware. The actual retrofitting process of legacy electronic intelligent devices typically involves an additional piece or pieces of hardware that can communicate using the device's native communications protocol and externally with other smart devices or the Internet using standardized connections and protocols. The benefits of retrofitting are improved product efficiency, expanded product functionality and improved product control. For example, the industrial control system of a machine can be retrofitted to incorporate local area network (LAN) access, enabling local data collection and providing real-time production statistics of the machine without having to redesign and build an entirely new machine. Or the machine can become accessible over the Internet, enabling remote diagnostics and control of the machine.

The inclusion of legacy devices and systems in the IoT ecosystem creates an environment never considered in original product and system designs. For example, devices and systems prior to retrofitting have rarely, if ever, been connected with other devices outside of a machine-to-machine (M2M) communications network for which they were initially designed. Devices and systems that were once segregated from each other and the world are now directly accessible through LANs and/or indirectly accessible over the Internet. This level of interconnectivity was not accounted for in original device and system designs, weakening the overall security posture and highlighting privacy and safety concerns for which additional protection is required.

The critical gap in device security and interlaced security between devices introduces risk into commercial and residential environments. Within the scope of smart devices, security includes: communications security, device and system access security and data security. Measures that are industry best practices for computer security are yet to be fully embraced by the smart device industry. For example, authenticating and encrypting data communications, user privileges, and data encryption are often overlooked, incorrectly implemented, or selectively addressed (e.g. data is encrypted, but communications are not). The risks of poorly implemented security include information leakage, data and information stealing, the ability to send and receive malicious malware and unauthorized device manipulation. The result of such risks could lead to the covert collection of photographs and metadata in addition to voice communications that are otherwise assumed to be private, the infection and spread of malicious malware across varying devices without user awareness, and the unauthorized local and remote manipulation of devices which can impair, stop, or destroy stationary and/or mobile sensors, devices, appliances, etc., or the systems of such. Some examples of poor smart device security implementation and system vulnerabilities is explored by Nitesh Dhanjani in his paper titled "Hacking Lightbulbs: Security evaluation of the Philips hue Personal Wireless Lighting System" and by Mike Metzger in his presentation "Letting the Air out of tire pressure monitoring systems" at Defcon 18.

It is estimated that there are currently over 25 billion connected devices in the world. The expansion of the IoT ecosystem by the proliferation of smart devices throughout modern day society highlights the importance of smart device security and data protection when considering privacy. Smart devices are creating a plethora of previously unattainable data, epic in proportions. The data generated by smart devices varies by device and manufacturer and the information contained within the data can be generic, specific, and/or sensitive in nature. Examples of the types of data include but are not limited to video, photographic, audio, device logs, measurement data such as temperature or power consumption, etc. Smart device data can be offloaded and collected by the device manufacturer or third parties through network connections. The data collected by a manufacturer might be used to improve and modify a device's performance and functionality or further enrich the user experience. Otherwise, a manufacturer might collect data with no defined purpose. Data collected from smart devices can also be sold to third parties. Details regarding what information is contained in a smart device's data are typically not documented and the user cannot easily, if at all, limit the dissemination of their data at the device level. The intentional and unintentional dissemination of data erodes the level of assumed and expected user privacy. For example, in February 2015 the media covered how the Samsung Smart TV's voice activation feature could technically record conversations and send the data back to third parties—eliminating any expectation of privacy within the device's microphone range.

Safety concerns are realized when a device that is part of the IoT ecosystem can be covertly accessed, controlled and/or have it's data furtively copied to external resources. Primarily, the ease of accessibility of smart devices from the Internet and local networks enables the mechanism for exploitation—risking system and user safety. A smart device's normal functionality can be adversely affected causing denial of service or device failure. Depending on the smart device/system being intentionally or unintentionally targeted, individuals and capital can be put at risk. For example, in 2011, computer scientists from the University of California, San Diego and the University of Washington reported on how a car can be accessed through its cellular and Bluetooth wireless systems. In 2013, researchers illustrated how the substandard security system of a car's smart devices coupled with wireless access could provide the ability to remotely override/command a car's electronic system. Their work demonstrated how the brake system of the car could be disabled, which prevented the driver from stopping the vehicle.

Other safety concerns exist outside of controlling a smart device. The data produced, stored and disseminated by a smart device can contain personal and unique identifying information. Unique information could be used to identify an individual or device for specific exploitation. Data can also reveal the components or topology of a system such as a security system, which risks the safety of what it is protecting. If large amounts of data are obtained from multiple smart devices and processed, the data as a whole could derive information such as an individual's pattern of life, opening them up to being taken advantage of.

Security, privacy and safety of smart devices are interdependent of each other as illustrated in the previous examples. As smart devices find new applications in everyday life and the IoT ecosystem continues to grow, the risk of device exploitation, device failure, data loss due to poor security, loss of privacy in otherwise assumed private environments and the safety of device operation and users continues to grow from both internal and external threats. Currently, companies perpetually fail to holistically address security, privacy, and safety concerns in the design of smart devices and systems. The industry shortcoming requires complimentary technology solutions to address the gaps. Traditional solutions such as firewalls only address data communications between the device and the Internet—omitting the data communications that occurs locally to the device, such as the device-to-device communications within a home, commercial or industrial environments. These systems are typically limited to Ethernet or Wi-Fi connections and do not incorporate other smart device protocols that are based on other standards such as the IEEE 802.15.4 standard. These technologies are also expensive to implement and maintain or are ineffective in protecting more than just Internet to local network communications. Configuration of such devices is also complex and tedious, requiring extensive technical knowledge of device communications (i.e. ports, protocols, etc.).

As illustrated, the ability to limit local and remote device and network access, control smart device communications, and limit information sharing on a local network or across the Internet is lacking. Security, privacy and safety concerns associated with smart devices are perpetuated by the inherent shortcomings of security mechanisms and the unrestrained access of potentially sensitive and private data. A user must be aware of and trust that the manufacturer has implemented the proper security and access restraints or be complacent with the fact they cannot trust the manufacturer. Concurrently, the user still does not know if the manufacturer or a nefarious entity is secretly collecting data from the device.

SUMMARY OF THE INVENTION

In one example, the system includes a gateway device, including a network interface including at least one of a wired connection or a wireless connection to each of a plurality of smart devices and to a network access point, a memory device including a local database storing internal firewall rules for communications on an internal network, and a processor. The processor is configured to execute a network controller configured to connect and communicate with the plurality of smart devices and the network access point, a firewall engine configured to enforce the internal firewall rules stored in the local database to filter internal communication between the plurality of smart devices, and a management interface configured to generate the internal firewall rules based on device profile information of each of the plurality of smart devices received from a remote database on an external network via the network access point.

In one example, the method includes operating a gateway device by connecting and communicating, by a network controller executed by a processor of the gateway device, with each of a plurality of smart devices and with a network access point connected to a network interface of the gateway device, enforcing, by a firewall engine executed by the processor, internal firewall rules stored in a local database of a memory device of the gateway device, for filtering internal communication between the plurality of connected smart devices on an internal network. The method also includes controlling, by a management interface executed by the processor, the gateway device to generate the internal firewall rules based on device profile information of each of the plurality of smart devices received from a remote database on an external network via the network access point.

BRIEF DESCRIPTION OF THE DRAWINGS

The invention is best understood from the following detailed description when read in connection with the accompanying drawings, with like elements having the same reference numerals. When a plurality of similar elements is present, a single reference numeral may be assigned to the plurality of similar elements with a small letter designation referring to specific elements. Included in the drawings are the following figures:

FIG. 7B is a wireframe diagram illustrating device association of FIG. 7A in accordance with aspects of the invention.

DETAILED DESCRIPTION OF THE INVENTION

In general, there is a need for a device that can protect smart devices from the Internet and from other devices within the same local/private network. Such a device should ideally require minimum technical knowledge from the user, implementing a simple configuration and control methodology for smart device data communications. It is desirable to have a centralized intermediate device that can easily be configured, per device, to limit network traffic between smart devices close in proximity and communications to and from the Internet. Such a device can improve device protection from external and internal threats while also protecting smart device data from being leaked or disseminated to unknown sources.

Figure 1:
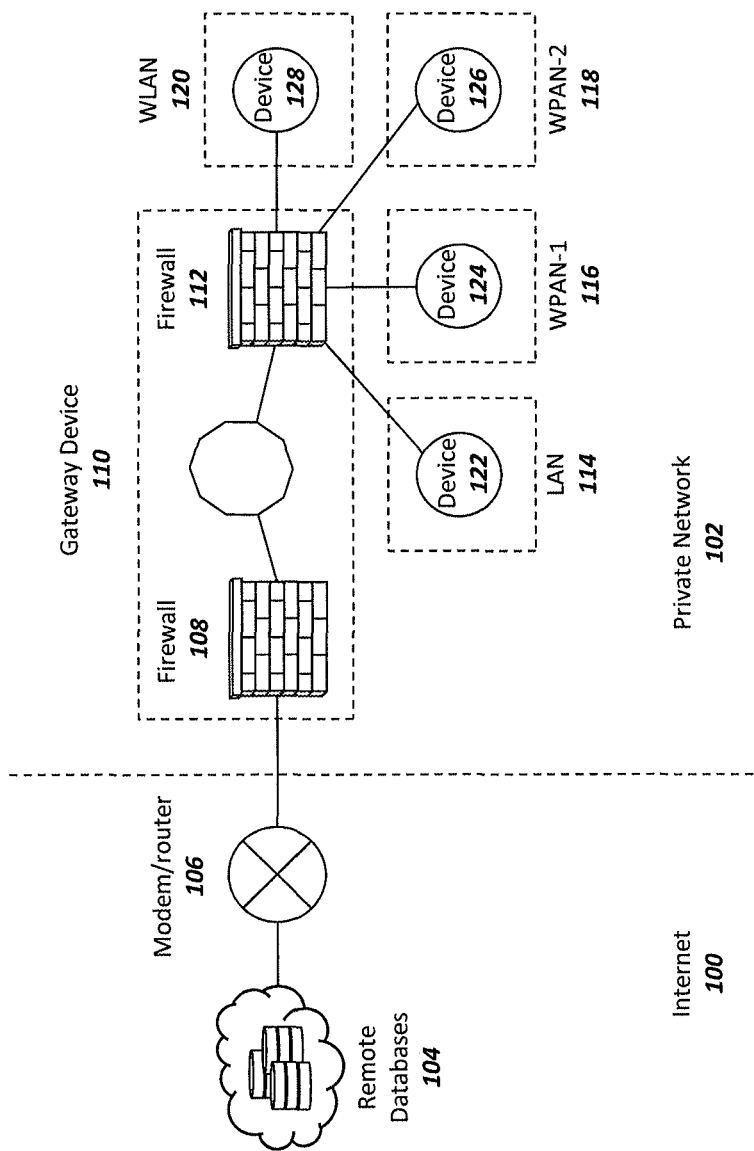
FIG. 1 is a high-level network diagram of a system for securing and protecting devices within a private network in accordance with aspects of the invention.

FIG. 1 is a high-level network diagram of a system for securing and protecting privately networked smart devices within the Internet of things (IOT) ecosystem in accordance with aspects of the invention. The illustrated diagram includes a network modem/router 106 that connects to the Internet 100 and connects to a gateway device 110 residing within a private network 102. The network modem/router 106 serves as a network access point, providing Internet 100 access to and from the gateway device 110. The gateway device 110 connects, manages, secures and protects multiple devices 122-128 and networks 114-120.

The type of devices, such as devices 122, 124, 126 and 128 among others, that connect to the gateway device 110 can be of industrial, commercial and/or consumer grades, and range from, but are not limited to, sensors, industrial control devices, wearable technologies, home appliances, mobile phones, vehicle systems, etc. When a device is first paired with the gateway device 110, the gateway device 110 authenticates to a known and trusted remote database 104 accessible via the Internet 100. Once the gateway device 110 and the remote database 104 have authenticated to each other and an encrypted tunnel for communications is established, the gateway device 110 queries the remote databases 104 for device specific information of the newly paired device. The remote databases 104 provide the gateway device 110 specific information (e.g. manufacturer information for each smart device) that is used for device management and device firewall rule configuration. The data collected by the gateway device 110 from the remote database 104 is stored in the memory of the gateway device 110. Device configuration and the remote databases 104 are further described later on with reference to FIGS. 2, 3 and 4.

Network access to and from the gateway device 110 includes wired and wireless technologies. In an embodiment, device 122 is connected to the gateway device 110 using a wired connection (LAN 114) while devices 124, 126 and 128 are connected to the gateway device 110 using different wireless connections (WPAN-1 116, WPAN-2 118 and WLAN 120). The configuration of the overall private network 102 is dynamic and can be changed based on the environment in which the gateway device 110 is employed, the technical requirements of a connecting device, or the types of wireless radio hardware technologies supported by the gateway device 110. Detail of the gateway device's 110 supported networks and network configuration is further described later on with reference to FIGS. 2, 5 and 6.

The gateway device 110 secures and protects devices 122-128 from the each other and the Internet 100 through application of default and user defined firewall rules, as illustrated by firewall 108 (i.e. external firewall) and 112 (i.e. internal firewall). The gateway device's 110 default firewall rule configurations prevent network communications between the Internet 100 and the gateway device 110 and the devices 122-128. The default firewall rule configurations also prevent local network communications between devices 122-128 associated with the gateway device 110. This is known as blacklisting. To enable communications between devices and across networks, a user specifically configures the gateway device 110 to enable such communication. Default and user defined internal/external firewall rules and firewall rule configuration are further described in detail later on with reference to FIGS. 2, 7A, 7B and 8.

Figure 2:
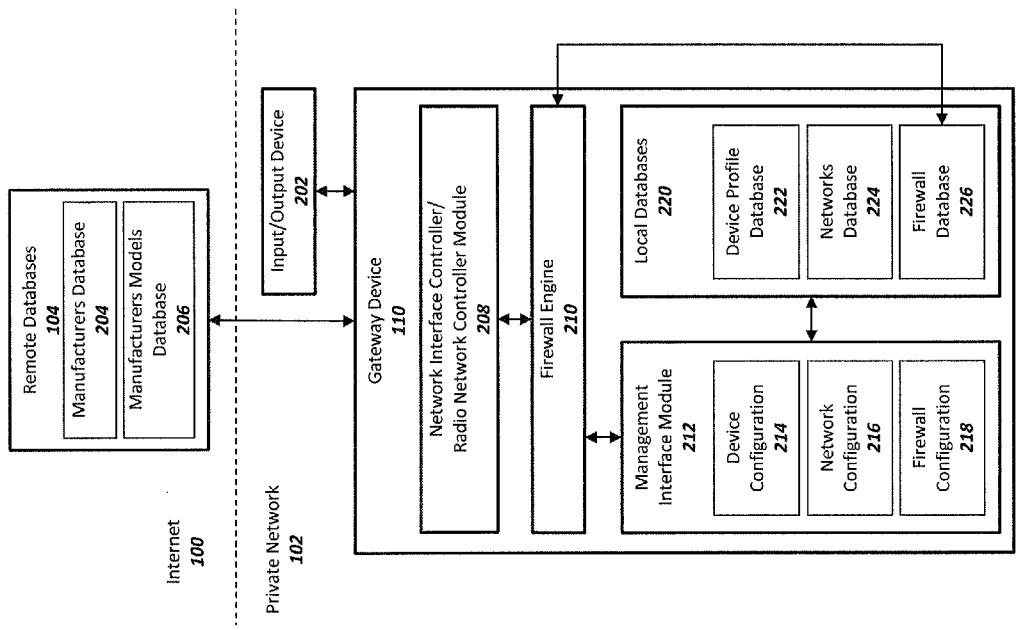
FIG. 2 is a block diagram of the components of the gateway device used in the system depicted in FIG. 1 in accordance with aspects the invention.

FIG. 2 depicts a detailed description of the gateway device 110 and associated components according to the aspects of the invention. The gateway device 110 is accessed with an input/output device 202 from the private network 102. The input/output device 202 may be designed to present data to a user and to receive inputs (e.g., user actions, device configuration, network configuration, firewall configuration) from a user when it is necessary to facilitate operation of the gateway device 110. The input/output device 202 may be a computer (e.g. desktop computer, notebook computer), mobile device (e.g., cellular phone, smart phone), tablet device, user interface on gateway device 110 (e.g., buttons, display, indicator lights), etc. In one embodiment, the input/output device 202 is configured to be wirelessly connected (e.g., via Bluetooth, cellular network, WiFi) to the gateway device 110. Other input/output devices 202 for the gateway device 110 will be understood by one of skill in the art from the description herein.

The gateway device's 110 network communications may be controlled and managed by, for example, a network interface controller/radio network controller (NIC/RNC) module 208. The NIC/RNC module 208 enables the gateway device 110 to connect and communicate externally using different mediums and technologies. In one embodiment, the NIC/RNC module 208 supports network communication between the gateway device 110 and a device 122 using a wired network connection as illustrated with LAN 114 (FIG. 1). In another embodiment, the NIC/RNC module 208 supports network communication between the gateway device 110 and devices 124-128 using wireless network connections as illustrated with WPAN-1 116, WPAN-2 118 and WLAN 120. The type of network technologies that are supported by the gateway device 110 include, but are not limited to, Ethernet technology based on the IEEE 802.3 standard, wireless local area network (WLAN) technologies based on the IEEE 802.11 standard (i.e. WiFi), wireless private area network (WPAN) technologies based on the IEEE 802.15.4 standard (e.g. Zigbee, Z-wave, 6LoPAN), and Bluetooth technologies (i.e. Bluetooth low energy).

The management interface module 212 controls the configuration of the gateway device 110. This module provides an interface to, and enables control over the gateway device 110. For example, the management interface module 212 may provide access to the device configuration 214, network configuration 216 and/or firewall configuration 218 components. To configure the gateway device 110, a user connects to it with an input/output device 202. Initially, access to the gateway device's 110 management interface module 212 may only be permitted from an input/output device 202 that is directly connected with a wired connection to the gateway device 110 user interface, e.g., a management port. This provides a mechanism for a user to access the management interface module 212 for configuration changes of the gateway device 110 while limiting attack vectors of the gateway device 110 from the Internet 100 and devices within the private network 102.

During initial device configuration 214, the gateway device 110 queries the remote databases 104. The gateway device 110 utilizes information from the manufacturers database 204 and manufacturers models database 206. The communications between the gateway device 110 and remote databases 104 is authenticated and encrypted, establishing a trusted communication path. The local databases 220 can be queried during device configuration 214, network configuration 216 and firewall configuration 218. The device profile database 222, networks database 224 and firewall database 226 are internal to the gateway device 100. In addition to the firewall database 226 being accessed during configuration, the firewall engine 210 may also accesses the firewall database 226.

Ingress and egress network traffic of the gateway device 110 is filtered by the firewall engine 210. The firewall engine 210 enforces system default and user defined firewall rules for the internal firewall 112 and the external firewall 108. The default firewall rules and user-defined firewall rules are initially loaded during the boot process of the gateway device 110 by the firewall engine 210. When a change is made to the firewall database 226, the new or updated firewall rule from the firewall database 226 is pushed to, and automatically loaded by, the firewall engine 210. If a firewall rule is removed, the firewall engine 210 is notified and the firewall rule is removed from the loaded firewall rule set. Default and user defined firewall rules are written to non-volatile memory and persist through power cycles of the gateway device 110. Firewall configuration 218 is further described later on with reference to FIGS. 7A, 7B and 8.

Figure 3:
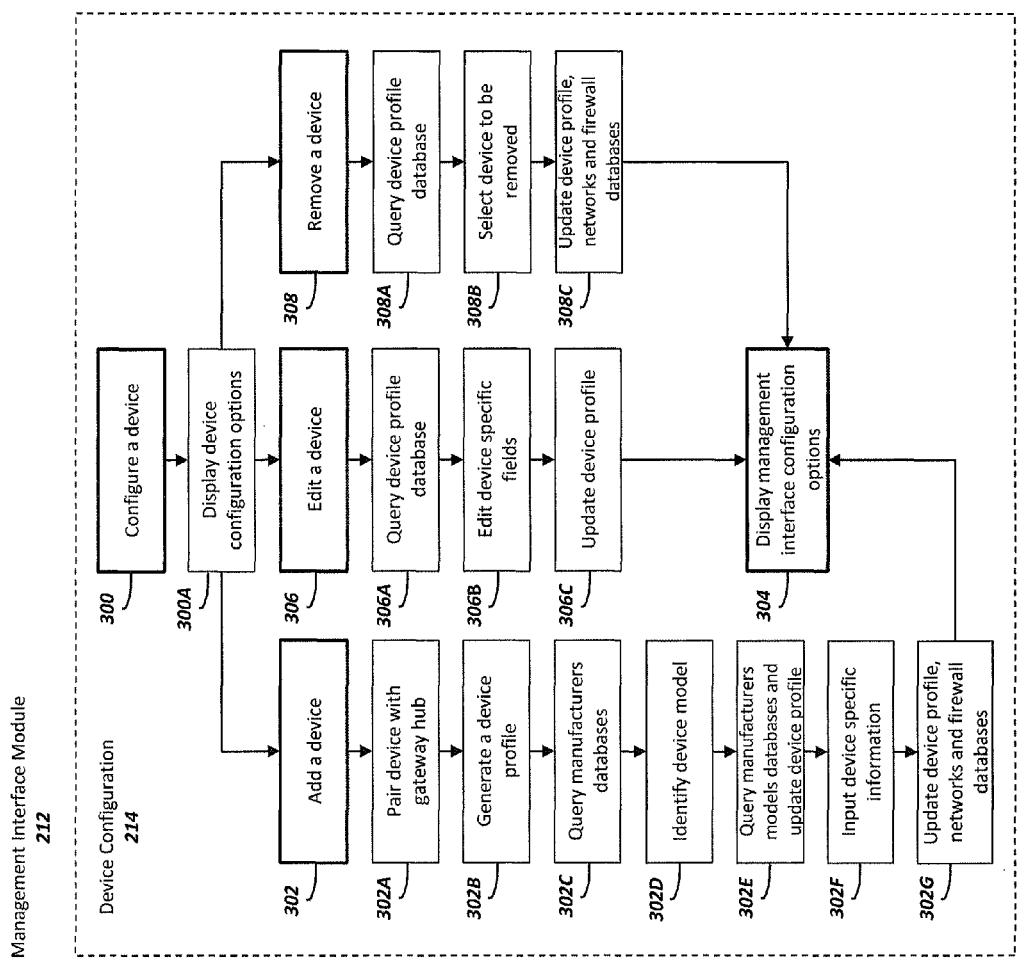
FIG. 3 is a flow diagram illustrating Device Configuration of FIG. 2 in accordance with aspects of the invention.

At FIG. 3 is a flowchart defining the process for adding, editing or removing a device from the gateway device 110 in accordance with aspects to the method and system. At block 300, a user connects to the gateway device 110 using an input/output device 202 and makes a request to configure a device through use of the gateway device 110 graphical user interface (GUI). The options available to the user for device configuration 214 are displayed as illustrated in block 300A. The user can add a new device 302, edit an existing device 306 or remove an existing device 308. Device configuration 214 options primarily utilize the device profile database 222. Changes in device configuration 214 can also affect the networks database 224 and the firewall database 226.

Figure 4:
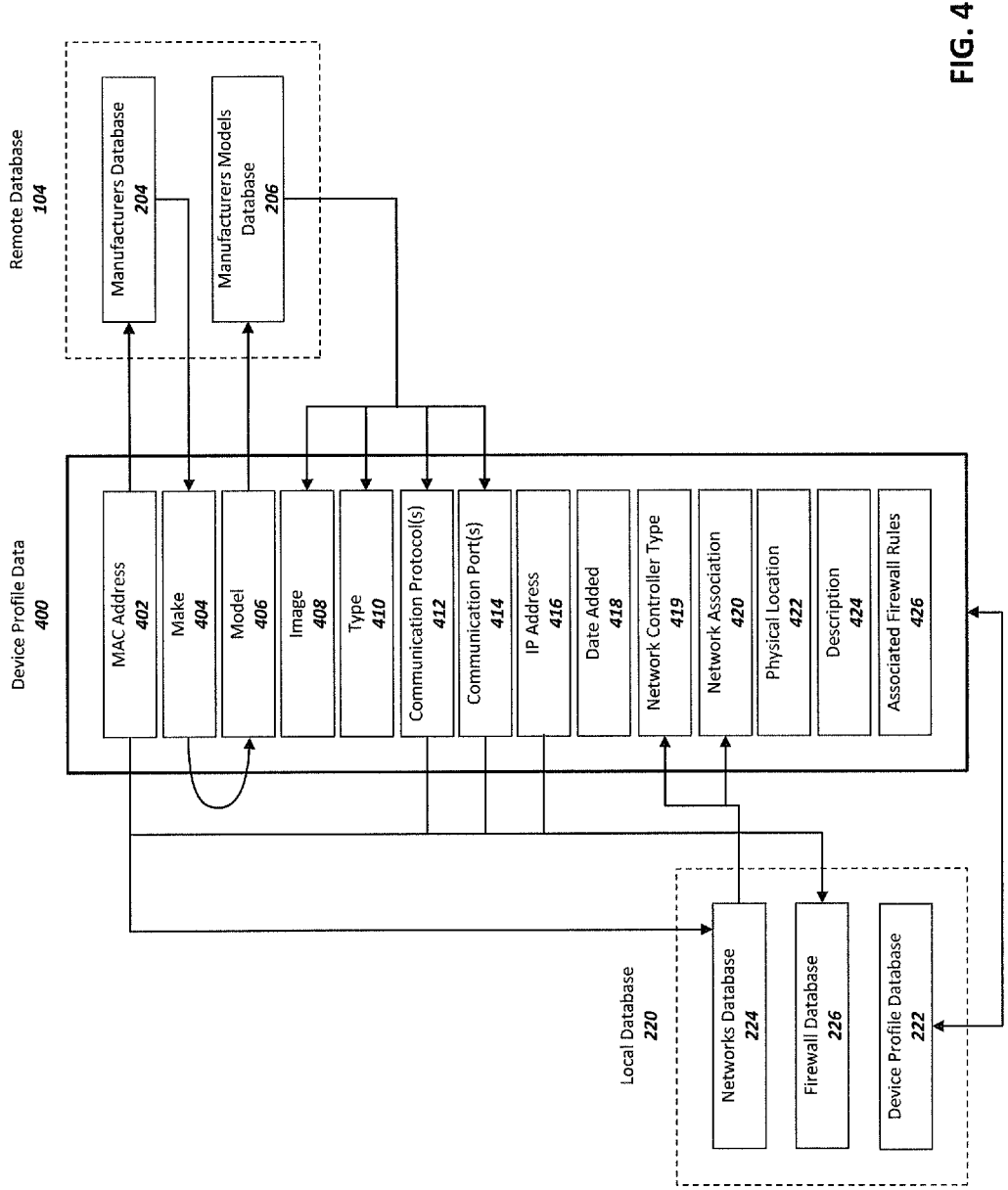
FIG. 4 is a block diagram depicting the Device Profiles Database of FIG. 2 in further detail in accordance with aspects of the invention.

As depicted in FIG. 4, the device profile database 222 includes device profile data 400. Depending on the device configuration 214 option selected, device profile data 400 is generated, edited or removed. In an embodiment, the device profile data 400 includes the device MAC address 402, make 404, model 406, image 408, type 410, communication protocol(s) 412, communication port(s) 414, IP address 416, date added 418, network controller type 419, network association 420, physical location 422, description 424 and associated firewall rules 426. The device profile data 400 is populated with information collected during device association. Device profile data 400 collection and utilization is further explained in FIGS. 3, 5, 7A and 7B.

Referring back to FIG. 3, at block 302, a device is added to the gateway device 110. Blocks 302A-302G depict one method for adding a device. At block 302A, the device pairing sequence is initiated between the gateway device 110 and a device being associated with the gateway device 110. The pairing sequence is device/manufacturer dependent and the user is prompted with the appropriate pairing process. If the device is not successfully paired with the gateway device 110, the device configuration options 300 is redisplayed.

At block 302B, the device profile data 400 for the newly associated device is generated and written to the local database's 220 device profile database 222. The device MAC address 402, IP address 416, the date the device is added 418, the network controller type 419, and the network association 420 are saved to the device's device profile data 400. The network controller type 419 identifies the network controller (NIC/RNC) technology the device uses for network communication (e.g. WiFi, Ethernet, 6LoPAN). The network controller type 419 of the device profile data 400 is set to the network controller type 604 of the network used for pairing. The network association 420 field of the device profile data 400 is set to the network ID 602 of the network used for pairing.

At block 302C, the gateway device 110 queries the remote databases 104. Using the device's MAC address 402, the manufacturers database 204 is searched to identify the manufacturer of the device based on the organizationally unique identifier (OUI) portion of the device's MAC address 402. The manufacturer's database 204 then returns the make 404 of the device and provides the models 406 associated with that specific manufacturer. At block 302D, the user selects the specific model of the device and the model is written to the model 406 field of the device profile data 400.

If, however, at block 302C the MAC address 402 of the device being paired to gateway device 110 does not match any of the manufacturers database 204 OUI entries, it is assumed that the device manufacturer for the specific device does not exist in the manufacturers database 204. In addition, it is assumed that the device does not exist in the manufacturers models database 206. If no entries exist in the manufacturers database 204, the make 406, model 406, image 408, type 410, communication protocol(s) 412 and communication port(s) 414 fields of the device profile data 400 are not populated with values. In this scenario, the user is prompted and presented two options for continuing: terminate the pairing sequence, or manually input the make 406, model 406, image 408, type 410, communication protocol(s) 412 and communication port(s) 414 values.

If the pairing sequence is terminated, steps 302D through 302G of FIG. 3 are omitted and no device profile data 400 entry is saved to the device profile database 222. The management interface module 212 configuration options are redisplayed to the user as illustrated with step 304. From the management interface module 212 GUI configuration menu, the user has the options of device configuration 214, network configuration 216 or firewall configuration 218.

If the user elects to manually input the make 406, model 406, image 408, type 410, communication protocol(s) 412 and communication port(s) 414 values for the device, the GUI enables them to do so. Empty device make, device model and device type fields are displayed, and the user can manually input values for each field. In addition, the user can set the image 408 parameter by selecting a generic image from the generic image listing (e.g. icon of a camera or a light bulb) that best matches the device being paired to the gateway device 110.

To manually set the communication protocol(s) and communication port(s) for which the device communicates with, gateway device 110 automatically probes the connecting device when the user selects to manually configure the device. Once the port scan of the device is completed, a listing of any and all open device ports are displayed to the user. For well-known ports (e.g. 21, 23, 25, 443, 465) that are identified as open, associated protocols (i.e. FPT, SSH, SMTP, HTTPS, SMTPS) may also be listed. Ports that are identified as open and are considered part of the registered ports range and the dynamic and/or private ports range are also listed but without associated protocols. The result of the port scan is displayed to the user in order to assist with identification of what ports the device might require to communicate properly. The user can select or deselect (e.g. using checkboxes) what ports/protocols from the list to include in the communication protocol(s) 412 and communication port(s) 414 fields. The user can also manually input port and protocol values using the blank communication protocol(s) and communication port(s) fields displayed in the GUI.

If at block 302D the model of the device being paired to the gateway device 110 does not exist in the manufacturers models database 206, the user is prompted to manually enter the information that the manufacturers models database 206 normally provides automatically. The methodology for manually inputting field values in this scenario is the same as the one described in the previous scenario (e.g. previous two paragraphs) for when the MAC address 402 of the device being paired to gateway device 110 does not match any of the manufacturers database 204 OUI entries (e.g. the device is probed for information, information is displayed to the user, and then the user manually selects/enters the information).

At block 302E, the manufacturer's models database 206 is queried using the device model 406 criteria selected by the user in block 302D. Based on the model criteria, an image 408, device type 410 (e.g. light, switch, motion sensor), and the communication protocol(s) 412 and communication port(s) 414 of the device are returned. This data is then saved as individual fields in the device profile data 400.

At block 302F, the user is promoted to input device specific information. This information includes physical location 422 and device description 424. The physical location 422 and device description 424 can be set to anything the user wants. For example, the physical location 422 can be set to "kitchen" and the description 424 can be set to "light over sink." Changes to the physical location 422 and device description 424 can occur after adding a device to the gateway device 110 using the edit a device 306 methodology illustrated in steps 306A-306C.

At block 302G, the device profile database 222 is updated with the new device profile data 400. In addition, the network database 224 is updated to include the newly associated device's MAC address 402 in the associated device profiles 610 field of the network profile data 600 for the network used by the newly added device. The firewall database 226 is also updated. Additional communication with the newly associated device is blacklisted by the gateway device's 110 default firewall rules, dropping ingress and egress network traffic of the device.

At block 304, the management interface module 212 configuration options are redisplayed to the user after adding a device to the gateway device 110. From the management interface module 212 GUI configuration menu, the user has the options of device configuration 214, network configuration 216 or firewall configuration 218.

At block 306, a device associated with the gateway device 110 is edited. Blocks 306A-306C depict an exemplary method for editing a device. At block 306A, the device profile database 222 is queried and associated devices 122-128 of the gateway device 110 are displayed. Using the input/output device 202, the user selects a device to edit. At block 306B, the physical location 422 and description 424 fields of the selected device profile data 400 can be edited.

At block 306C, the device profile data 400 of the device profile database 222 is updated with edits made to the physical location 422 and/or the device description 424 at block 306B.

At block 304, the management interface module 212 configuration options are redisplayed to the user after a device has been edited. From the management interface module 212 GUI configuration menu, the user has the options of device configuration 214, network configuration 216 or firewall configuration 218.

At block 308, a device associated with the gateway device 110 is removed. Blocks 308A-308C depict an exemplary method for removing a device. At block 308A, the device profile database 222 is queried and associated devices 122-128 of the gateway device 110 are displayed. At block 308B, a user selects a device 122-128 to be disassociated from the gateway device 110 using the input/output device 202. When a device is removed from the gateway device 110, data associated with the device is removed. The device profile data 400 is removed from the device profile database 222 and the networks database 224 is updated. When the networks database 224 is updated, the device's MAC address 402 is removed from the network's network profile data 600 associated device profiles 610 field. The firewall rule database 226 is also updated to remove related firewall rule data 800 associated with the device. The firewall rule data 800 related to the device being removed is identified by the entries in the device profile data 400 associated firewall rules 426 field.

Figure 5:
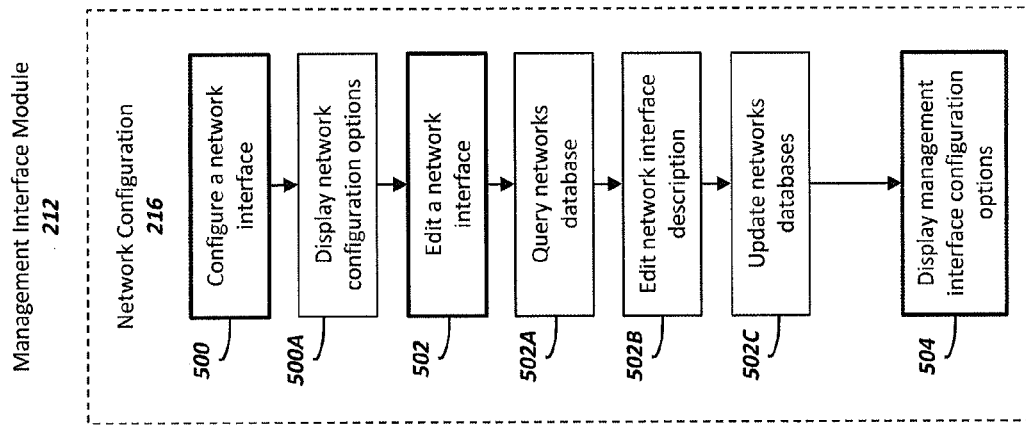
FIG. 5 is a flow diagram illustrating Network Configuration of FIG. 2 in accordance with aspects of the invention.

At FIG. 5 is a flowchart defining the process for editing a network interface of the gateway device 110 in accordance with aspects to the method and system. At block 500, a user connects to the gateway device 110 using an input/output device 202 and makes the request to configure a network interface through use of the gateway device 110 GUI. The options available to the user for network configuration 216 are displayed as illustrated in block 500A. The user can edit a network interface 502 from this menu. Network configuration 216 options utilize the networks database 224. Changes in network configuration 216 can also affect the device profiles database 222.

Figure 6:
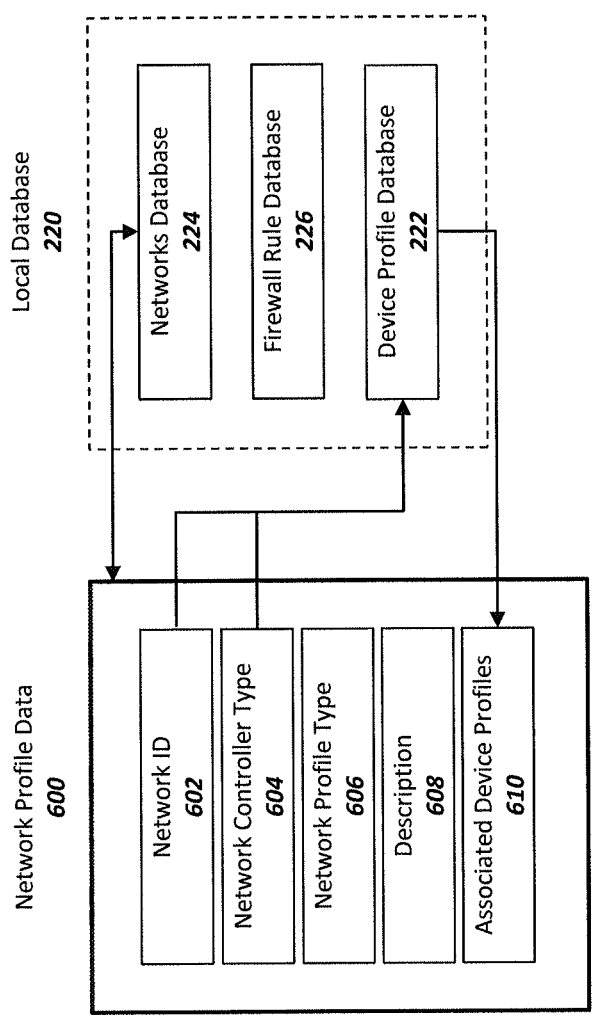
FIG. 6 is a block diagram depicting the Networks Database of FIG. 2 in further detail in accordance with aspects of the invention.

As depicted in FIG. 6, the networks database 224 includes network profile data 600. The network profile data 600 can be edited using the network configuration 216 management interface module 212. In an embodiment, the network profile data 600 fields include a network ID 602, network controller type 604, network profile type 606, description 608, and associated device profiles 610. The network ID 602 is a statically defined unique identifier used to reference a specific NIC/RNC interface. The network controller type 604 statically defines the type of NIC/RNC that is used while the network profile type 606 identifies the NIC/RNC as a default or non-user created interface. Within this embodiment, the network profile type 606 of each NIC/RNC interface is set to default. The associated device profiles 610 field is populated with each devices MAC address that is associated with the specific network.

At block 502, a network interface of the gateway device 110 is edited. Blocks 502A-502C depict an exemplary method for editing a network interface. At block 502A, the networks database 224 is queried and network interfaces of the gateway device 110 are displayed. Using the input/output device 202, the user selects which network to edit. At block 502B, the description 608 field of the selected network profile data 600 can be edited. A network interface of the gateway device 110 can be edited to have a unique description set for the network profile data's 600 description 608 field. At block 502C, the changes made to the description 608 field of the network profile data 600 are written to the firewall rule database 226.

At block 504, the management interface module 212 configuration options are redisplayed to the user after a network interface has been edited. From the management interface module 212 GUI configuration menu, the user has the options of device configuration 214, network configuration 216 or firewall configuration 218.

Device firewall rules (both internal rules for controlling communication between devices within the private network, and external rules for controlling communication between devices in the private network and devices in an external network such as the Internet) are constructed using the firewall configuration 218 component of the management interface module 212. Firewall configuration 218 enables a user to control and customize network traffic to and from the gateway device 110. By default, the gateway device 110 drops ingress and egress network traffic to and from paired devices. To enable and control communication between the gateway device 110 and Internet 100, or communication between the gateway device 110 and an associated device 122-128, or communication between an associated device 122-128 and the Internet 100, or communication between two or more associated devices 122-128 of the gateway device 110, user defined, device specific inbound and/or outbound firewall rules are configured.

Initial device configuration 214 creates new firewall policies that are immediately enforced. For example, when a device is paired with the gateway device 110, as described in FIG. 3, new firewall rules are created in the firewall database 226 automatically. The newly created firewall rules enable communication between the gateway device 110 and the newly paired device in order to allow the pairing process to occur. Otherwise, the external/internal firewall rules prevent communications of the newly paired device to and from the Internet 100 in addition to communications between other smart devices associated with the gateway device 110.

Figure 7A:
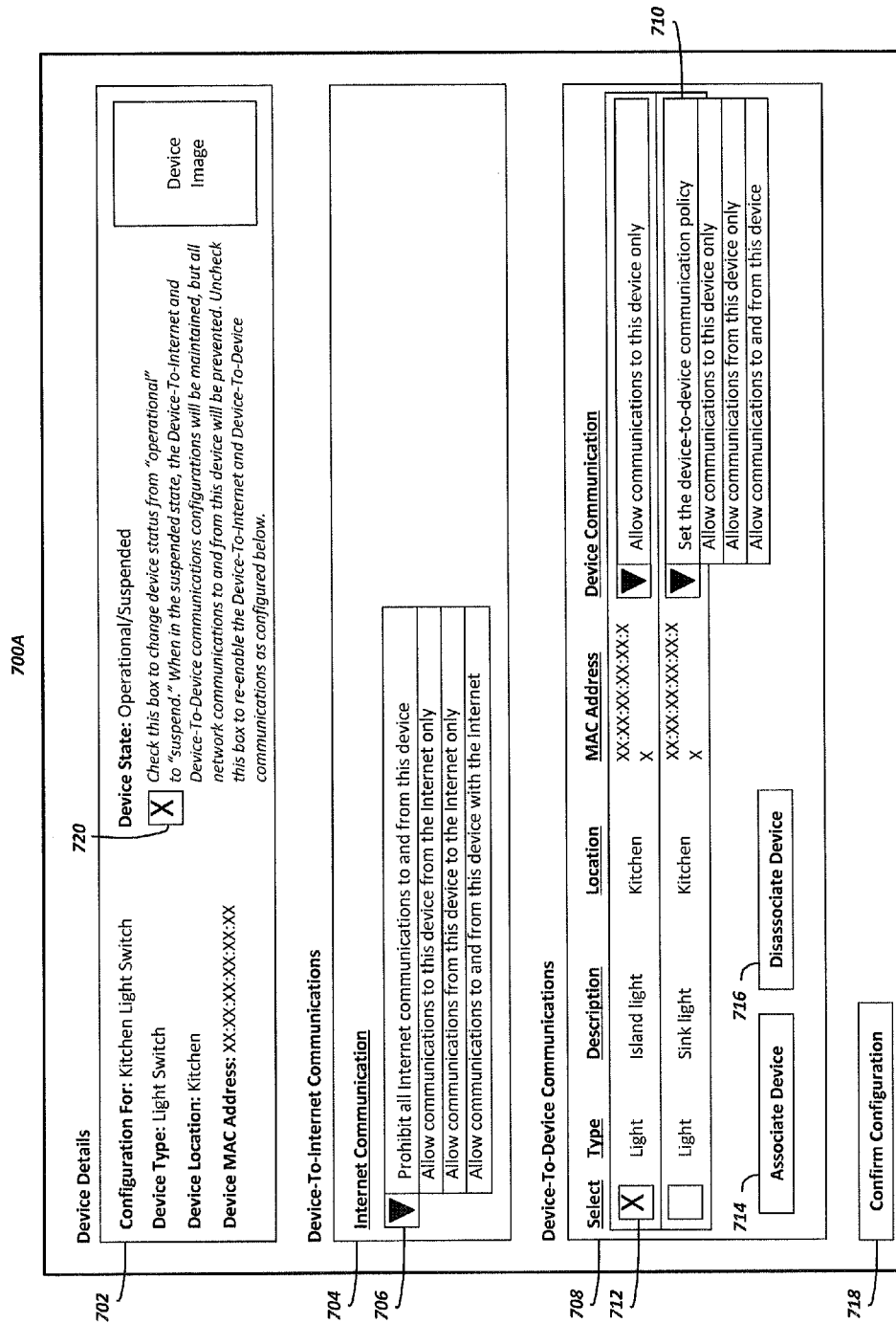
FIG. 7A is a wireframe diagram illustrating Firewall Configuration of FIG. 2 in further detail in accordance with aspects of the invention.

FIG. 7A is a wireframe representation of a graphical user interface 700A for configuring firewall rules of a device 122-128. After a device 122-128 has been associated with the gateway device 110, device specific external/internal firewall rules enable communication between the device and Internet 100 and communications between the device and other devices 122-128 paired with the gateway device 110. To configure a device's 122-128 firewall rules, a user connects to the gateway device 110 using the input/output device 202 and makes the request for firewall configuration 218. At the user request, the device profile database 222 is queried and a listing of associated devices 122-128 within the database is displayed. Device type 410, description 424, physical location 422, MAC address 402, make 404 and model 406 are displayed and the devices can be sorted based on these categories. When a device 122-128 is selected from the list, the firewall configuration GUI 700A is displayed.

The firewall configuration GUI 700A displays the selected device's details 702, the device-to-Internet communications 704 configuration and the device-to-device communications 708 configurations. The device details 702 section utilizes data from the device profile database 222 and displays the selected device's description 424, type 410, physical location 422, MAC address 402, and the image 408 of the device. The device details 702 section also includes the device's state, which the user can change between "Operational" and "Suspended" using the associated checkbox 720, as later described.

The device-to-Internet communications 704 configuration section of the GUI 700A enables control over the flow of network traffic between the selected device and Internet 100. By default, when a device is paired with the gateway device 110, it may not be able to send or receive network traffic from the Internet 100. Preventing ingress and egress network communication is an inbound firewall rule policy and an outbound firewall rule policy that drops network traffic of protocols and ports between devices 122-128 and the Internet 100. These firewall rules are not accessible to the user. When GUI 700A is loaded, the dropdown menu 706 of the device-to-Internet communications 704 configuration section is set to the current firewall configuration. This setting is based on the device profile data 400 associated firewall rules 426 field entries. When the GUI is loaded, the firewall database 226 is queried for the associated firewall rule data 800 and populated based on the query. To change the current firewall configuration of the device-to-Internet communications 704, the dropdown menu 706 is used.

The dropdown menu 706 provides the options to: prohibit all Internet communications to and from this device (default setting of newly paired device), allow communications to this device from the Internet only, allow communications from this device to the Internet only, and allow all communications to and from this device with the Internet. When the device-to-Internet communications 704 configuration policy is changed with the dropdown menu 706, firewall rules are either added and/or removed when the confirm configuration 718 button is pressed. For example, when a device/Internet firewall rule policy is changed from "Prohibit all communications to and from this device with the Internet" to "Allow communications to and from this device with the Internet," an inbound and an outbound firewall rule is added to the firewall rule database 222. These rules include the devices communication protocol(s) 412 and communication port(s) 414 from the device profile data 400 (as originally provided by the remote databases) that the device can communicate with. Therefore, even if a device is configured to communicate with the Internet 100, only traffic of the specific protocol(s) and port(s) of the device is allowed. When a firewall rule is added or removed, the device profile data 400 associated firewall rules 426 field of the selected device is updated to add or remove the associated firewall rule ID 802. Changes to the firewall database 226 are automatically communicated to the firewall engine 210 and loaded, updating the firewall engine 210 network traffic enforcement policies. The user defined firewall rules override the default firewall rules based on hierarchical policy enforcement, enabling the flow of network traffic as described by the user defined firewall rules.

Figure 8:
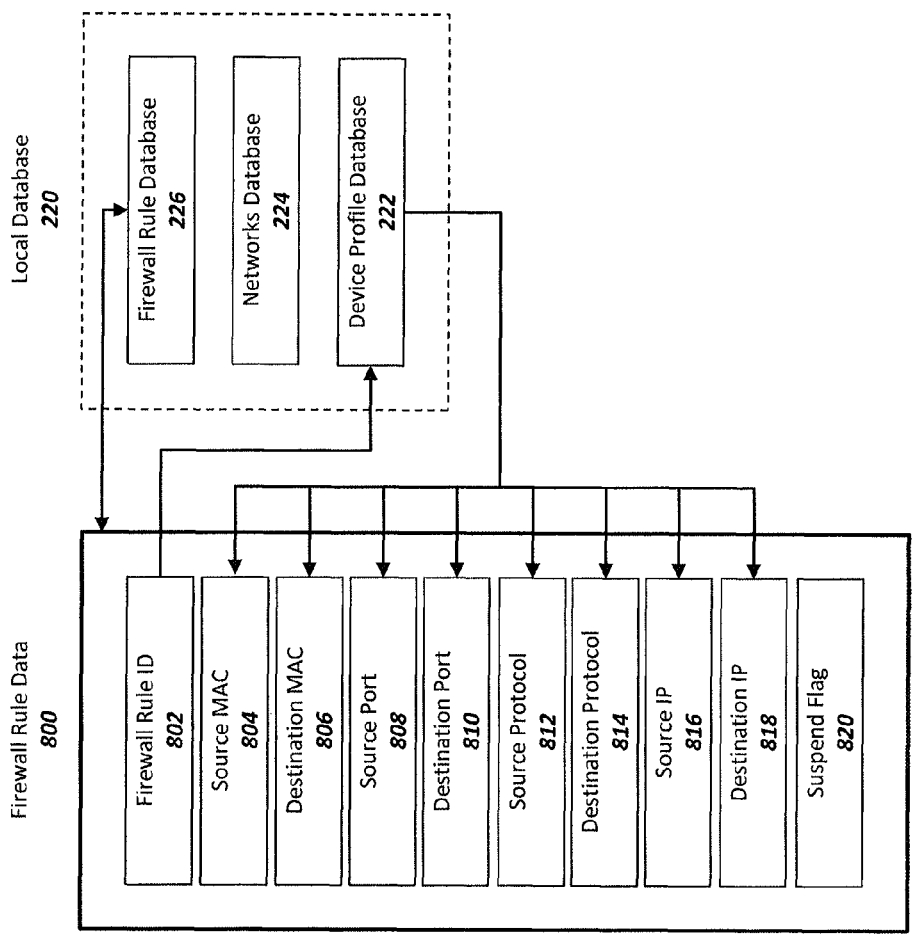
FIG. 8 is a block diagram depicting the Firewall Database of FIG. 2 in further detail in accordance with aspects of the invention.

FIG. 8 describes the components of the firewall rule data 800. This data is structured to support inbound and outbound firewall rules for which the firewall engine 210 loads to enforce network communication policies. Specific components include: firewall rule ID 802, source MAC 804, destination MAC 806, source port 808, destination port 810, source protocol 812, destination protocol 814, source IP 816, destination IP 818 and suspend flag 820. These components are further explained in the following descriptions.

The device-to-device communications 708 configuration section of the GUI 700A enables user control of network traffic between devices 122-128 paired with the gateway device 110. By default, when a device is paired with the gateway device 110, it may not be able to pass or receive network traffic from another device 122-128 of the same or different local networks. Preventing network communication is an inbound and an outbound firewall rule that drops network traffic of protocols and ports between devices 122-128. If the device selected for configuration has not been configured for device-to-device communications, no devices are listed in the device-to-device communications 708 configuration section of the loaded GUI 700A. If the selected device has previously been configured, device associations based on device profile data 400 associated firewall rules 426 fields with the same firewall rule entries are displayed in the device-to-device communications 708 configuration section. To add a device association in the device-to-device communications 708 configuration section, the associate device 714 button of the GUI 700A is pressed.

When the associate device 714 button is pressed, another graphical user interface 700B, as illustrated in FIG. 7B, opens. When opened, the device profiles database 222 is queried and devices 122-128 that are not already associated with the device being configured, determined by the device profile data 400 associated firewall rules 426 field of the devices not having matching entries, are displayed in list form 722. The list includes device type 410, description 424, physical location 422, MAC address 402, make 404 and model 406. Next to each entry is a checkbox 724 for device selection. One or multiple devices can be selected at once. Device association occurs when one or more devices are selected and the confirm selection 726 button is pressed. After the confirm selection 726 button is pressed, the device selection GUI 700B closes and the firewall configuration GUI 700A updates with the device-to-device communications 708 section populated with the new and currently associated devices 122-128.

Devices listed in the device-to-device communications 708 section of the GUI 700A includes information about the device's type 410, description 424, physical location 422, and MAC address 402. This information is provided by the device profile database 222. Additionally, the type of communication allowed between the two devices, as determined by the current firewall rules of the firewall database 226, is identified in the dropdown menu 710. If a device displayed was just selected as previously described, there are no firewall rule settings and the dropdown menu 710 is set to: set the device-to-device communication policy. To set the network filtering policies for the devices, one of three options available in the dropdown menu 710 is selected. The three options available include: allow communications to this device only, allow communications from this device only, and allow communications to and from this device. Depending on the dropdown menu 710 option selected, firewall rules are either added and/or removed when the confirm configuration 718 button is pressed. If a device in the list is currently associated and configured, the current communications posture is displayed in the dropdown menu 710 and can be changed.

New device associations and changes to current device associations are applied when the confirm configuration 718 button is pressed. For example, when a device/device security policy is changed from "allow communications to this device only" to "allow communications to and from this device," an inbound firewall rule is automatically added to the firewall rule database 222 for the device listed in the device details 702 portion of wireframe 700A. This rule includes the selected device's devices communication protocol(s) and communication port(s) it is allowed to communicate through. Therefore, the associated device can communicate to the selected device using the specific protocol(s) and port(s) of the selected device. Network traffic between the two devices that uses any protocol(s) or port(s) not listed in the firewall rule data 800 is dropped by the gateway device 110. Network traffic can still move from the selected device to the associated device as the outbound firewall rule still exists from the previous setting. The device profile database 222 is updated to add or remove the firewall rule IDs 802 from the associated firewall rules 426 field of the devices. Changes to the firewall database 226 are automatically communicated to the firewall engine 210, and the firewall engine 210 network traffic enforcement policies are updated. The user defined firewall rules override the default firewall rules, allowing network traffic flow as defined by the firewall rule policies.

To prevent communications between a selected device and an associated device, the associated device is selected, as illustrated with checkbox 712, and removed. Once one, or multiple devices are selected, the disassociate device 716 button is pressed. When the disassociate device 716 button is pressed, the associated firewall rules between the selected device and associated device are deleted. The device profile data 400 associated firewall rules 426 field for both devices are updated and the firewall rule IDs 802 of the deleted firewall rules are removed. Changes to the firewall database 226 are automatically communicated to the firewall engine 210, and the firewall engine 210 network traffic enforcement policies are updated. The removal of user defined firewall rules enforce the default firewall rules that prevent network communications between the devices 122-128.

In FIG. 7A, when the device state of the device being configured is set to "operational" in the device details 702 section, all firewall rule configurations are applied as previously described. When checkbox 720 is checked, the device state is set to suspended. When the device is in a suspended state, all device associated firewall rule data 800 is updated to have the suspend flag 820 set, identifying that the firewall rule should be ignored. Therefore, any firewall rule data 800 with the suspend flag 820 set is ignored by the firewall engine 210. This causes all the network communications to and from the suspended device to be dropped by the default firewall rules, as if there were no specific firewall rules configured for the device. To re-enable all of the Device-To-Internet and Device-To-Device configurations previously configured, checkbox 720 is unchecked and each firewall rule data 800 entry of the firewall rule database 226 for the specific device is updated to have the suspend flag 820 unset. Once all of the firewall rule data 800 entries have all been updated to remove the suspend flag 820 for the specific device, the firewall engine 210 applies firewall rules for that device, managing the device's device-to-Internet and device-to-device network communications as the user has configured.

Although the method and system is illustrated and described herein with reference to specific embodiments, the method and system is not intended to be limited to the details shown. Rather, various modifications may be made in the details within the scope and range of equivalents of the claims and without departing from the method and system.

What is claimed:
1. A gateway device, comprising:
a network interface including at least one of a wired connection or a wireless connection to each of a plurality of smart devices and to a network access point;
a memory device including a local database storing internal firewall rules for communications on an internal network, and external firewall rules for communications on an external network; and
a processor configured to execute:
a network controller configured to connect and communicate with the plurality of smart devices and the network access point,
a firewall engine configured to enforce the internal firewall rules stored in the local database to filter internal communication between the plurality of smart devices within the internal network, and configured to enforce the external firewall rules stored in the local database to filter external communication between the plurality of smart devices and the external network,
a query of a remote database on the external network to retrieve device profile information for each of the plurality of smart devices, and
a management interface configured to:
generate or modify the internal firewall rules based on device profile information of each of the plurality of smart devices received from the remote database via the network access point and stored in a device profile database of the gateway device,
receive a first user selection of an external firewall rule indicating whether to prohibit external network communications to and from one of the plurality of smart devices, or to allow communications to the one of the plurality of smart devices from the external network, or to allow communications from the one of the plurality of smart devices to the external network, or to allow communications to and from the one of the plurality of smart devices with the external network,
receive a second user selection of an internal firewall rule indicating whether to allow communications to the one of the plurality of smart devices, or to allow communications from the one of the plurality of smart devices, or to allow communications to and from the one of the plurality of smart devices, and
update the external and the internal firewall rules for the one of the plurality of smart devices based on the first user selection and the second user selection respectively,
wherein when a manufacturer or a model number of the one of the plurality of smart devices does not exist in the remote database, the processor of the gateway device is further configured to:
probe the one of the plurality of smart devices and receive information including at least one communication port number and at least one communication protocol from the one of the plurality of smart devices,
display the received information to a user of the gateway device, and receive user input from an input/output interface of the gateway device, based on the displayed information and configure the firewall engine based on the received user input.

2. The gateway device of claim 1, wherein the gateway device is further configured to:
connect to the remote database through the network interface and the network access point,
retrieve manufacturer information for each of the plurality of smart devices from the remote database, and
store the retrieved manufacturer information in the local database of the memory device as the device profile information.

3. The gateway device of claim 1, wherein the device profile information is provided by the remote database for each of the plurality of smart devices and includes at least one of make, model, type communication protocols, or communication ports of each device.

4. The gateway device of claim 1, wherein the management interface is further configured to:
control the gateway device to communicate with an input/output device using a graphical user interface (GUI) displayed on the input/output device, and
use input received from a user through the GUI to configure the firewall engine with user specified internal firewall rules, and configure the plurality of smart devices with additional user specified device profile information.

5. The gateway device of claim 1, wherein the management interface is further configured to:
receive user input from an input/output device to add a new smart device,
connect to the new smart device through the network interface,
retrieve identification information from the new smart device,
retrieve manufacturer information of the new smart device from the remote database based on the identification information and store the manufacturer information in the local database as the device profile information, and
receive additional user specified information from the input/output device for configuring the new smart device and the firewall engine.

6. The gateway device of claim 1, wherein the management interface is further configured to:

receive user selection from an input/output device to edit one of the plurality of smart devices,
receive user input from the input/output device including at least one of device profile information to configure the selected one of the plurality of smart devices, network interface information for configuring the network controller, or firewall engine rules for configuring the firewall engine, and
configure the firewall engine based on the received user input and store the received user input in the local database.

7. The gateway device of claim 1, wherein the management interface is further configured to:
receive user input from an input/output device to remove one of the plurality of smart devices, and
remove information associated with the one of the plurality of smart devices from the local database, the information including the device profile information, the internal firewall rules and the network information stored in the local database and associated with the one of the plurality of smart devices.

8. A method for operating a gateway device, comprising:
connecting and communicating, by a network controller executed by a processor of the gateway device, with each of a plurality of smart devices and with a network access point connected to a network interface of the gateway device,
querying, by the processor, a remote database on the external network to retrieve device profile information for each of the plurality of smart devices,
enforcing, by a firewall engine executed by the processor:
internal firewall rules stored in a local database of a memory device of the gateway device, for filtering internal communication between the plurality of connected smart devices on an internal network, and
external firewall rules stored in the local database of the memory device of the gateway device, for filtering external communication between the plurality of connected smart devices and an external network, and
receiving, by the processor, a first user selection of an external firewall rule indicating whether to prohibit external network communications to and from one of the plurality of smart devices, or to allow communications to the one of the plurality of smart devices from the external network, or to allow communications from the one of the plurality of smart devices to the external network, or to allow communications to and from the one of the plurality of smart devices with the external network,
receiving, by the processor, a second user selection of an internal firewall rule indicating whether to allow communications to the one of the plurality of smart devices, or to allow communications from the one of the plurality of smart devices, or to allow communications to and from the one of the plurality of smart devices, and
updating, by the processor, the external and the internal firewall rules for the one of the plurality of smart devices based on the first user selection and the second user selection respectively,
controlling, by a management interface executed by the processor, the gateway device to generate or modify the internal firewall rules based on device profile information of each of the plurality of smart devices received from the remote database via the network access point and stored in a device profile database of the gateway device,
wherein when a manufacturer or a model number of the one of the plurality of smart devices does not exist in the remote database, the processor of the gateway device is further configured to:
probe the one of the plurality of smart devices and receive information including at least one communication port number and at least one communication protocol from the one of the plurality of smart devices,
display the received information to a user of the gateway device, and
receive user input from an input/output interface of the gateway device, based on the displayed information and configure the firewall engine based on the received user input.

9. The method of claim 8, further comprising:
connecting, by the gateway device, to the remote database through the network interface and the network access point,
retrieving, by the gateway device, manufacturer information for each of the plurality of smart devices from the remote database, and
storing, by the gateway device, the retrieved manufacturer information in the local database of the memory device as the device profile information.

10. The method of claim 8, wherein the device profile information is provided by the remote database for each of the plurality of smart devices and includes at least one of make, model, type communication protocols, or communication ports of each device.

11. The method of claim 8, further comprising:
controlling, by the management interface, the gateway device to communicate with an input/output device using a graphical user interface (GUI) displayed on the input/output device, and
using, by the management interface, input received from a user through the GUI to configure the firewall engine with user specified internal firewall rules, and configure the plurality of smart devices with additional user specified device profile information.

12. The method of claim 8, further comprising:
receiving, by the management interface, user input from an input/output device to add a new smart device,
connecting, by the management interface, to the new smart device through the network interface,
retrieving, by the management interface, identification information from the new smart device,
retrieving, by the management interface, manufacturer information of the new smart device from the remote database based on the identification information and store the manufacturer information in the local database as the device profile information, and
receiving, by the management interface, additional user specified information from the input/output device for configuring the new smart device and the firewall engine.

13. The method of claim 8, further comprising:
receiving, by the management interface, user selection from the input/output device to edit one of the plurality of smart devices,
receiving, by the management interface, user input from an input/output device including at least one of device profile information to configure the selected one of the plurality of smart devices, network interface information for configuring the network controller, or firewall engine rules for configuring the firewall engine, and configuring, by the management interface, the firewall engine based on the received user input and store the received user input in the local database.

14. The method of claim 8, further comprising:

receiving, by the management interface, user input from an input/output device to remove one of the plurality of smart devices, and removing, by the management interface, information associated with the one of the plurality of smart devices from the local database, the information including the device profile information, the internal firewall rules and the network information stored in the local database and associated with the one of the plurality of smart devices.

* * * * *